(12) United States Patent
Kapur et al.

(10) Patent No.: US 12,177,066 B2
(45) Date of Patent: *Dec. 24, 2024

(54) CONFIGURATION FOR MULTI-STAGE NETWORK FABRICS

(71) Applicant: Juniper Networks, Inc., Sunnyvale, CA (US)

(72) Inventors: Sukhdev S. Kapur, Saratoga, CA (US); Michael Henkel, Saratoga, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/321,842

(22) Filed: May 23, 2023

(65) Prior Publication Data
US 2023/0300020 A1    Sep. 21, 2023

Related U.S. Application Data

(63) Continuation of application No. 17/248,902, filed on Feb. 12, 2021, now Pat. No. 11,706,085, which is a continuation of application No. 16/146,738, filed on Sep. 28, 2018, now Pat. No. 10,924,335.

(51) Int. Cl.
    *H04L 41/0803* (2022.01)
    *H04L 41/12* (2022.01)
    *H04L 49/25* (2022.01)

(52) U.S. Cl.
    CPC ......... *H04L 41/0803* (2013.01); *H04L 41/12* (2013.01); *H04L 49/25* (2013.01)

(58) Field of Classification Search
    CPC ...... H04L 41/12; H04L 41/0803; H04L 49/25
    See application file for complete search history.

(56) References Cited

U.S. PATENT DOCUMENTS

| 7,380,025 | B1 | 5/2008 | Riggins et al. |
| 9,807,035 | B1 | 10/2017 | Hanks et al. |
| 10,924,335 | B2 | 2/2021 | Kapur et al. |

(Continued)

FOREIGN PATENT DOCUMENTS

| WO | 2013184846 A1 | 12/2013 |
| WO | 2018149701 A1 | 8/2018 |

OTHER PUBLICATIONS

Communication pursuant to Article 94(3) EPC from counterpart European Application No. 19181485.4 dated Dec. 8, 2021, 11 pp.

(Continued)

*Primary Examiner* — James P Duffy
(74) *Attorney, Agent, or Firm* — Shumaker & Sieffert, P.A.

(57) ABSTRACT

A method includes deploying a network device within a fabric having a management network by attaching the network device through the management network to a port of a role allocator, wherein the role allocator includes one or more ports designated as first level port connections and one or more other ports designated as second level port connections. If the deployed network device is attached to one of the ports designated as first level port connections, the deployed network device is configured as a first level device. If the deployed network device is attached to one of the ports designated as second level port connections, the deployed network device is configured as a second level device.

18 Claims, 6 Drawing Sheets

(56) References Cited

U.S. PATENT DOCUMENTS

| | | | | |
|---|---|---|---|---|
| 11,706,085 B2* | 7/2023 | Kapur | ................... | H04L 49/15 370/254 |
| 2012/0317637 A1* | 12/2012 | Huang | ............... | H04L 61/2514 726/12 |
| 2015/0280993 A1 | 10/2015 | Gourlay et al. | | |

OTHER PUBLICATIONS

Extended Search Report from counterpart European Application No. 19181485.4, dated Dec. 3, 2019, 7 pp.

First Office Action and Search Report, and translation thereof, from counterpart Chinese Application No. 201910537452.6 dated Dec. 27, 2021, 20 pp.

Moy, "OSPF Version 2," Network Working Group, RFC 2328, Apr. 1998, 244 pp.

Notice of Intent to Grant from counterpart Chinese Application No. 201910537452.6 dated Mar. 19, 2023, 2 pp.

Oran, "OSI IS-IS Intra-domain Routing Protocol," Network Working Group, RFC 1142, Feb. 1990, 676 pp.

Prosecution History for U.S. Appl. No. 16/146,738, dated Apr. 3, 2020 to Nov. 16, 2020, 31 pp.

Prosecution History for U.S. Appl. No. 17/248,902, dated Oct. 5, 2022 to Jun. 2, 2023, 21 pp.

Przygienda et al., "RIFT: Routing in Fat Trees," draft-ietf-rift-rift-01, RIFT Working Group, Apr. 26, 2018.

Rekhter et al., "A Border Gateway Protocol 4 (BGP-4)," Network Working Group, RFC 4271, Jan. 2006.

Response to Communication pursuant to Article 94(3) EPC dated Dec. 8, 2021, from counterpart European Application No. 19181485.4 filed Apr. 6, 2022, 44 pp.

Response to Extended Search Report dated Dec. 3, 2019 from counterpart European Application No. 19181485.4, filed Oct. 1, 2020, 5 pp.

Response to Office Action dated Oct. 10, 2022, from counterpart Chinese Application No. 201910537452.6 filed Dec. 22, 2022, 18 pp.

Second Office Action from counterpart Chinese Application No. 201910537452.6 dated Oct. 10, 2022, 15 pp.

Communication pursuant to Article 94(3) EPC from counterpart European Application No. 19181485.4 dated Sep. 12, 2023, 10 pp.

Response to Communication pursuant to Article 94(3) EPC dated Sep. 12, 2023, from counterpart European Application No. 19181485.4 filed Jan. 9, 2024, 15 pp.

* cited by examiner

CONFIGURATION FOR MULTI-STAGE NETWORK FABRICS

CROSS REFERENCE

This application is a continuation of U.S. patent application Ser. No. 17/248,902, filed 12 Feb. 2021, which is a continuation of U.S. patent application Ser. No. 16/146,738, filed 28 Sep. 2018, each of which is hereby incorporated by reference herein in its entirety.

TECHNICAL FIELD

This disclosure relates to computer networks.

BACKGROUND

A data center is a collection of interconnected computer servers and associated components, housed in one or more facilities. In a typical data center, a large collection of interconnected servers provides computing and/or storage capacity for execution of various applications. For example, a data center may comprise a facility that hosts applications and services for subscribers, i.e., customers of data center. The data center may, for example, host all of the infrastructure equipment, such as networking and storage systems, redundant power supplies, and environmental controls. In most data centers, clusters of storage systems and application servers are interconnected via a high-speed switch fabric provided by one or more tiers of physical network switches and routers. More sophisticated data centers provide infrastructure spread throughout the world with subscriber support equipment located in various physical hosting facilities.

Data centers are often made up of a large number of devices, including both servers and devices that form an Internet Protocol (IP) fabric. The IP fabric may be represented as an underlay network having leaf and spine devices.

SUMMARY

In general, this disclosure describes techniques for network configuration based on automatic topology discovery and configuration. In particular, network devices such as routers are configured to automatically determine their place in the network and to provision themselves accordingly.

In one example, this disclosure describes a network device comprising: a plurality of network ports, each of the network ports capable of being coupled to a fabric; and processing circuitry configured to: establish a network connection through the fabric to one of a plurality of role allocator ports of a role allocator, identify a role allocator port to which the network device is connected over the network connection, and configure the network device based on the identified role allocator port.

In another example, this disclosure describes a method comprising deploying a network device within a fabric having a management network by attaching a port of the deployed network device through the management network to one of a plurality of ports of a role allocator; establishing a network connection through the fabric to one of a plurality of role allocator ports of a role allocator; identifying a role allocator port to which the network device is connected over the network connection; and configuring the network device based on the identified role allocator port.

As yet another example, this disclosure describes a non-transitory computer-readable storage medium has stored thereon instructions that, when executed, cause a processor of a network device to: establish a network connection through a management network within a fabric to one of a plurality of role allocator ports of a role allocator; identify a role allocator port to which the network device is connected over the network connection; and configure the network device based on the identified role allocator port.

The details of one or more examples are set forth in the accompanying drawings and the description below. Other features, objects, and advantages will be apparent from the description and drawings, and from the claims.

DETAILED DESCRIPTION

As noted above, in a typical data center, a large collection of interconnected servers provides computing and/or storage capacity for execution of various applications. Typically, the servers are interconnected using switches configured in a Leaf and Spine topology. In some example approaches, the same network device may be used as a leaf node and as a spine node. It can, therefore, be difficult for a management device to discover the role of a switch added to the fabric of the data center. Hence, assignment of these roles may require manual intervention on the part of operators to assign such roles. Unfortunately, manual intervention can lead to misconfiguration; customer reported bugs are often configuration related.

Figure 1A:
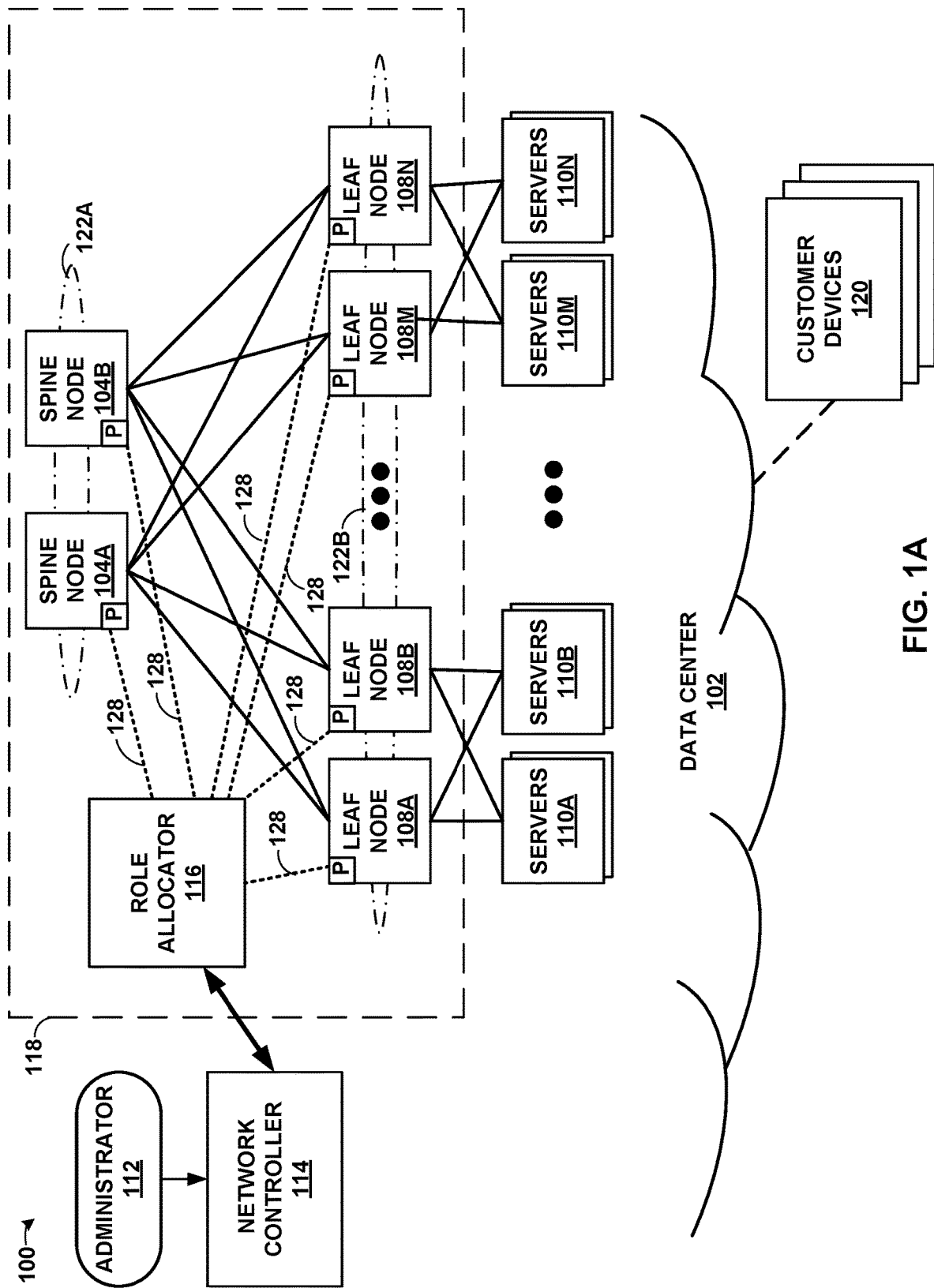
FIGS. 1A and 1B are block diagrams illustrating networks having data centers, in accordance with techniques of the disclosure.
Figure 1B:
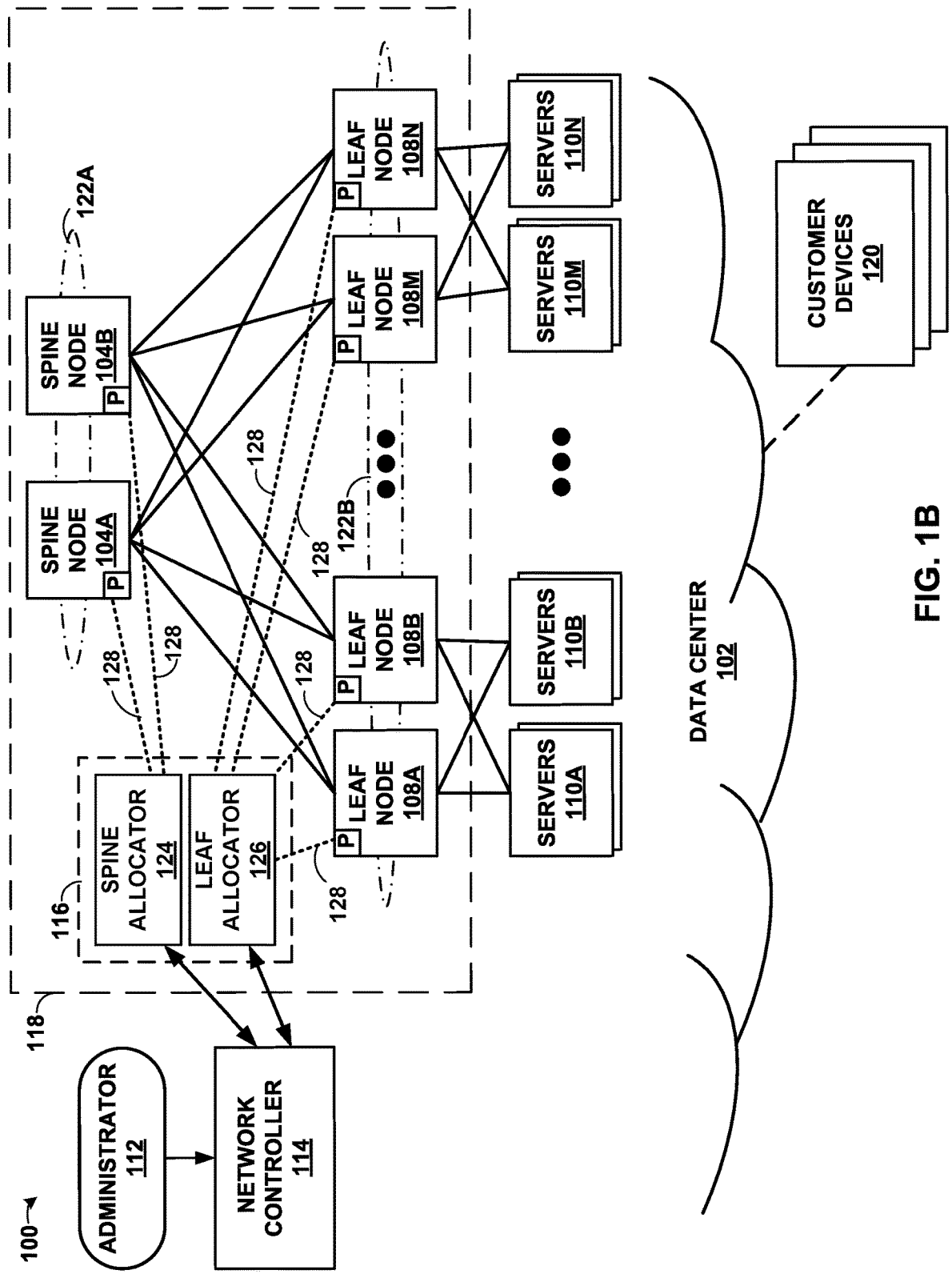

FIGS. 1A and 1B are block diagrams illustrating networks having data centers, in accordance with techniques of the disclosure. In the example approaches of FIGS. 1A and 1B, network 100 includes a data center 102 connected to customer devices 120. Data center 102 includes a set of storage systems and application servers 110A-110N (servers 110) interconnected via Internet protocol (IP) fabric 118, which may comprise a fabric provided by one or more tiers of physical network devices, such as, for example, routers, gateways, switches, hubs, modems, bridges, repeaters, multiplexers, servers, virtual machines running on one or more of the same, and other example network devices.

In general, data center 102 provides an operating environment for applications and services for customer devices 120 coupled to the data center, e.g., by a service provider network (not shown). Data center 102 may, for example, host infrastructure equipment, such as networking and storage systems, redundant power supplies, and environmental controls. In some examples, a service provider network that couples customer devices 120 to data center 102 may be coupled to one or more networks administered by other providers, and may thus form part of a large-scale public network infrastructure, e.g., the Internet.

In some examples, data center 102 represents one of many geographically distributed network data centers. As illustrated in the example approaches of FIGS. 1A and 1B, data center 102 may be a facility that provides network services for customers through customer devices 120. Customer devices 120 may include the devices of entities (such as enterprises and governments) and of individuals. For example, a network data center may host web services for both enterprises and end users. Other example services may include data storage, virtual private networks, traffic engineering, file service, data mining, scientific- or super-computing, and so on. In some examples, data center 102 may be individual network servers, network peers, or otherwise. In some examples, data center 102 is an enterprise or internal data center.

In these examples, data center 102 includes a set of storage systems and application servers 110A-110N (servers 110) interconnected via Internet protocol (IP) fabric 118, which may comprise a fabric provided by one or more tiers of physical network devices, such as, for example, routers, gateways, switches, hubs, modems, bridges, repeaters, multiplexers, servers, virtual machines running on one or more of the same, and other example network devices. In the examples shown, IP fabric 118 includes two tiers of nodes: spine nodes 104A and 104B (spine nodes 104) and leaf nodes 108A-108N (leaf nodes 108). Servers 110 provide execution and storage environments for applications and data associated with customers via customer devices 120 and may be physical servers, virtual machines or combinations thereof.

In the examples shown in FIGS. 1A and 1B, IP fabric 118 includes two tiers of nodes: spine nodes 104A and 104B (spine nodes 104) and leaf nodes 108A-108N (leaf nodes 108). Other topologies may be used in other examples. Servers 110 provide execution and storage environments for applications and data associated with customers via customer devices 120 and may be physical servers, virtual machines or combinations thereof.

In general, IP fabric 118 represents layer two (L2) and layer three (L3) switching and routing components that provide point-to-point connectivity between servers 110. In one example, IP fabric 118 comprises a set of interconnected, high-performance yet off-the-shelf packet-based routers and switches that implement industry standard protocols. In one example, IP fabric 118 may comprise off-the-shelf components that provide Internet Protocol (IP) point-to-point connectivity. In some multi-staged networks such as IP fabric 118, each switch resides in a defined layer of the network. As shown in the example of FIG. 1, spine nodes 104 reside in a first, top layer 122A and leaf nodes 108 reside in a second layer 122B (collectively, "network layers 122"). As shown in the examples of FIGS. 1A and 1B, each of spine nodes 104 is communicatively coupled to each of leaf nodes 108A-108N.

In general, IP fabric 118 represents layer two (L2) and layer three (L3) switching and routing components that provide point-to-point connectivity between servers 110. In one example, IP fabric 118 comprises a set of interconnected, high-performance yet off-the-shelf packet-based routers and switches that implement industry standard protocols. In one example, IP fabric 118 may comprise off-the-shelf components that provide Internet Protocol (IP) point-to-point connectivity.

In one example approach, IP fabric 118 is configured as a multi-stage network. Multi-stage data center networks, such as Clos or networks with a so-called "fat tree" topology, may be used in data centers for high performance and resiliency. In some example approaches, fat tree networks may allow for multi-pathing.

In one example approach, IP fabric 118 includes a Virtual Chassis Fabric (VCF). VCF may be used to provide a low-latency, high-performance fabric architecture that can be managed as a single device. A VCF is constructed using a spine-and-leaf architecture. In the spine-and-leaf architecture, each spine device is interconnected to one or more leaf devices. A VCF may support up to twenty total devices, and up to four devices may be configured as spine devices.

In one such example approach, a VCF is configured to allow path weights that reflect and react to a path's end-to-end bandwidth. Such a capability is termed "smart trunks" in VCF. Smart trunks capabilities may, in some example approaches, be enabled by a Virtual Chassis Control Protocol (VCCP) that runs inside a VCF to provide globally optimized weights on the multi-paths.

In one example approach, IP fabric 118 is a loosely-federated folded multi-stage network where all nodes of IP fabric 118 run IP routing protocols. The routing protocols, which may include, for example, external border gateway protocol (EBGP), include all paths between leaf nodes 108 in IP fabric 118, and equal cost multipath (ECMP) is used to utilize all paths. The Routing in Fat Trees (RIFT) protocol allows use of any set of all available least-hops paths disregarding ECMP constraints. Additional information regarding RIFT can be found in Internet-Draft entitled RIFT: Routing in Fat Trees (draft-ietf-rift-rift-01), dated Apr. 26, 2018, as promulgated by the Internet Engineering Task Force (IETF), which is incorporated herein by reference.

In FIGS. 1A and 1B, network controller 114 provides a high-level controller for configuring and managing routing and switching infrastructure of data center 102. Network controller 114 may represent, for example, a software defined network (SDN) controller that communicates and manages the devices of data center 102 using an SDN protocol, such as the Path Computation Element (PCE) Communication Protocol (PCEP). In some examples, network controller 114 may communicate and manage the devices of data center 102 using eXtensible Messaging and Presence Protocol (XMPP), PCEP or Border Gateway Protocol messages. Additionally, or alternatively, network controller 114 may communicate with the routing and switching infrastructure of data center 102 using other interface types, such as a Simple Network Management Protocol (SNMP) interface, path computation element protocol (PCEP) interface, a Device Management Interface (DMI), a CLI, Interface to the Routing System (IRS), or any other node configuration interface.

Network controller 114 provides a logically—and in some cases, physically— centralized controller for facilitating operation of one or more networks within data center 102 in accordance with examples of this disclosure. In some examples, network controller 114 may operate in response to configuration input received from network administrator 112. Additional information regarding network controller 114 operating in conjunction with other devices of data center 102 can be found in International Application Number PCT/US2013/044378, filed Jun. 5, 2013, and entitled PHYSICAL PATH DETERMINATION FOR VIRTUAL NETWORK PACKET FLOWS, which is hereby incorporated by reference.

In one example approach, as illustrated in FIG. 1A, network controller 114 communicates with each node 104, 108 through a role allocator 116. In one such example approach, each role allocator 116 includes a management link 128 to a management port P on each node 104, 108. The port may be a dedicated management port, or it may just be a port dedicated to management. Management port P on each node 104, 108 is used to configure and manage the node 104, 108. In one example approach, role allocator 116 is a switch with ports designated as dedicated to spine nodes 104 and ports designated as dedicated to leaf nodes 108. In such an example approach, a node 104, 108 may be assigned its role by attaching port P of the node through link 128 to one of the dedicated spine ports of role allocator 116 or to one of the dedicated leaf ports of role allocator 116. Any router or switch connected through management link 128 to the dedicated spine ports of role allocator 116 is assumed to be a spine node 104 while any router or switch connected through management link 128 to the dedicated leaf ports of role allocator 116 is assumed to be a leaf node 108.

In another example approach, each role type has a different role allocator. In one such example approach, as is illustrated in FIG. 1B, role allocator 116 includes a spine allocator 124 and a leaf allocator 126. Any router or switch connected through management link 128 to spine allocator 124 is assumed to be a spine node 104 while any router or switch connected through management link 128 to leaf allocator 126 is assumed to be a leaf node 108.

Although not shown, data center 102 may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices.

In general, network traffic within IP fabric 118, such as packet flows between servers 110, may traverse the physical network of IP fabric 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

Figure 2:
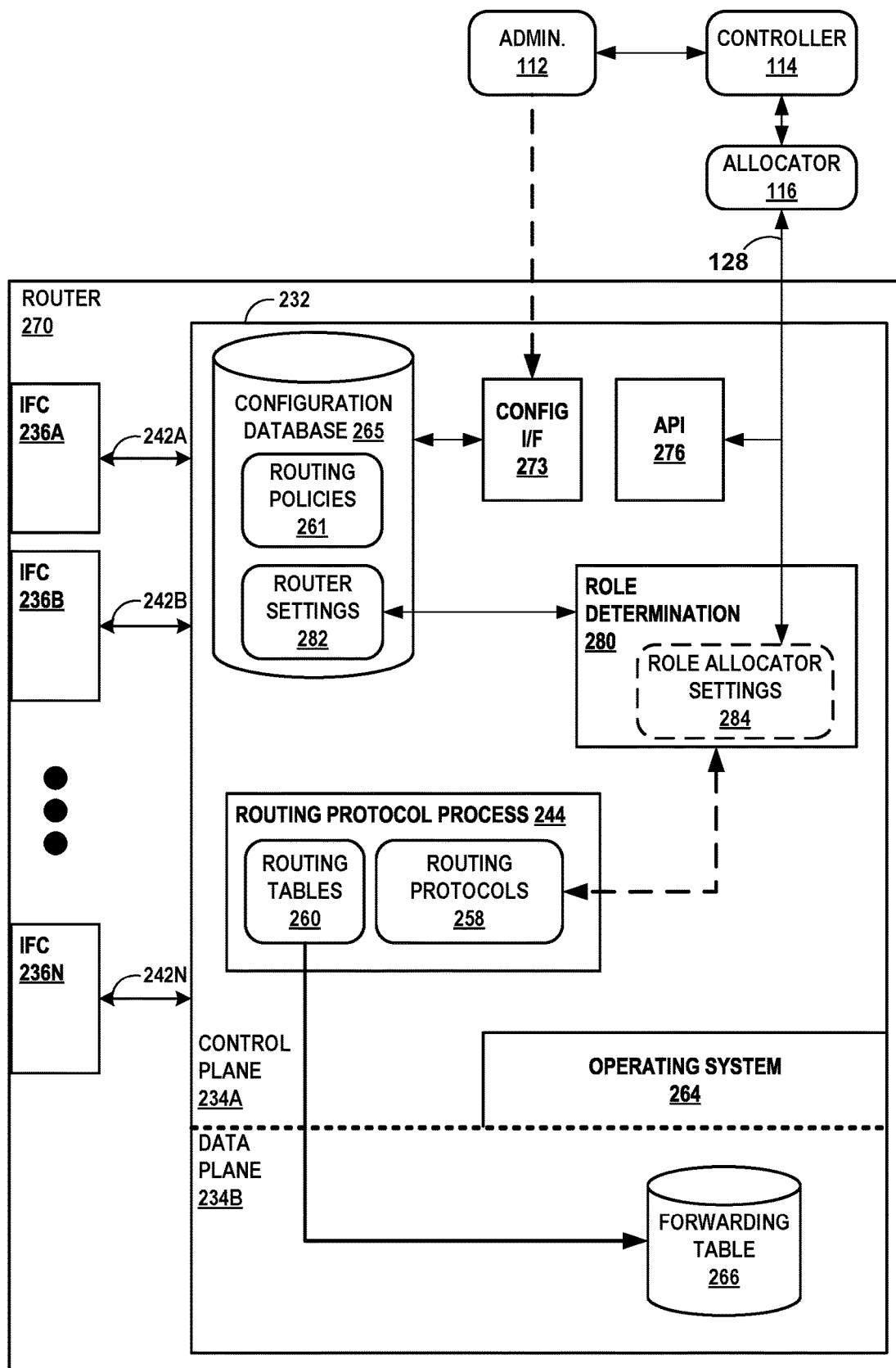
FIG. 2 is a block diagram illustrating an example of a router that implements an automatic topology discovery and provisioning process, in accordance with techniques of the disclosure.

FIG. 2 is a block diagram illustrating an example of a router 270 capable of automatic role discovery and configuration, in accordance with techniques of the disclosure. In one example, a role determination process 280 may operate as a submodule of routing protocol 258. For purposes of illustration, example router 270 may be described in the context of network 100 and may represent an example instance of nodes 104, 108 of FIGS. 1A and 1B.

In one example approach, router 270 includes a control unit 232 and interface cards 236A-236N ("IFCs 236") coupled to control unit 232 via internal links 242A-242N. Control unit 232 may comprise one or more processors (not shown in FIG. 2) that execute software instructions, such as those used to define one or more software or computer programs, stored to a computer-readable storage medium (not shown in FIG. 2), such as non-transitory computer-readable media. Non-transitory computer-readable media include storage devices (e.g., a disk drive, or an optical drive) and memory (such as Flash memory, random access memory or RAM) and may be used to store instructions to cause the one or more processors to perform the techniques described herein. Alternatively, or additionally, control unit 232 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

In this example, control unit 232 is divided into two logical or physical "planes" to include a first control or routing plane 234A ("control plane 234A") and a second data or forwarding plane 234B ("data plane 234B"). That is, control unit 232 implements two separate functionalities, e.g., the routing/control and forwarding/data functionalities, either logically, e.g., as separate software instances executing on the same set of hardware components, or physically, e.g., as separate physical dedicated hardware components that either statically implement the functionality in hardware or dynamically execute software or a computer program to implement the functionality.

Control plane 234A represents hardware or a combination of hardware and software of control unit 232 that define control plane functionality of router 270. Control plane 234A manages and controls the behavior of router 270, including the behavior of data plane 234B. Operating system 264 of control plane 234A provides a run-time environment for multiple different processes. Operating system 264 may represent, for example, a UNIX operating system derivative such as Linux or Berkeley Software Distribution (BSD). Operating system 264 offers libraries and drivers by which processes may interact with data plane 234B, for example, or other hardware of router 270, including a file-system, storage device(s), and main memory for router 270. Libraries and drivers of operating system 264 may include Application Programming Interfaces (APIs) that provide standard interfaces for developers to invoke the functionality of operating system 264 and router 270 exposed by the libraries and drivers.

Control plane 234A executes one or more processes. Routing protocol process 244 ("RP module 244") represents a routing protocol process that executes one or more routing protocols 258 by which at least some of the routing information stored to one or more routing tables 260 may be determined. For example, routing protocols 258 may include the RIFT protocol. Routing tables 260 represent a data structure for storing routing information and may represent tables, lists, trees/tries, or other data structures. A routing table may alternatively be referred to as a routing information base or may alternatively be considered a data structure within the routing information base of the router 270.

Routing tables 260 stored to a computer-readable storage device of control unit 232 (not shown in FIG. 2) may include information defining at least a portion of a network topology of a network, such as IP fabric 118 of FIGS. 1A and 1B. Each of routing tables 260 may be associated with a different address family or network layer protocol, such as unicast or multicast IPv4 and IPv6, and MPLS. Any one or more of routing tables 260 may be predefined by the routing protocol process 244 or may be explicitly created by an administrator 112 using configuration interface 273 or by network controller 114 using application programming interface (API) 276. In the example approach of FIG. 2, network controller 114 communicates with API 276 through allocator 116 via management link 128. In some such example approaches, allocator 116 is a switch or router connected to a management port P via management link 128 as described above in the discussion of FIGS. 1A and 1B. Router 270 receives configuration data via the configuration interface 273 or API 276 and stores the configuration data to configuration database 265.

Configuration interface 273 is a process executing on control plane 234B that provides an interface by which administrator 112, a network operator or network management system for instance, may modify the configuration database 265 of router 270 (typically through management link 128). Configuration interface 273 may present a Command Line Interface (CLI) and/or a graphical user interface (GUI) by which an administrator or other management entity may modify the configuration of router 270 using text-based commands and/or graphical interactions, respectively. In addition, or in the alterative, configuration interface 273 may present an agent that receives Simple Network Management Protocol (SNMP), Border Gateway Protocol messages, or Netconf commands from a management device to set and retrieve configuration information in configuration database 265 for router 270.

Application programming interface (API) 276, in the illustrated example, is a communications interface by which a network controller 114 may modify the configuration database 265 or modify any of routing tables 260. Network controller 114 may represent a network management system, a software-defined networking (SDN) controller, and/or orchestration system. API 276 may be a HTTP-based RESTful interface using JavaScript Object Notation (JSON) or eXtensible Markup Language data objects for exchanging configuration data and routing information between the network controller 114 and the router 270. API 276 may include another type of API, such as a Remote Procedure Call (RPC) based API.

Routing protocol process 244 resolves the topology defined by routing information in routing tables 260 to select and/or determine one or more active routes through the network. Routing protocol process 244 may then synchronize data plane 234B with these active routes, where data plane 234B maintains a representation of these routes as forwarding table 266 (alternatively, "forwarding information base (FIB) 266"). Routing protocol process 244 may generate forwarding table 266 in the form of a radix or other lookup tree to map packet information (e.g., header information having destination information and/or a label stack) to next hops and ultimately to interface ports of IFCs 236. The operating system 264 kernel may maintain a master copy of the forwarding table 266 and install portions of the master copy to forwarding components of data plane 234B, such as packet forwarding engines.

Forwarding or data plane 234B represents hardware or a combination of hardware and software of control unit 232 that forwards network traffic in accordance with forwarding table 266. Data plane 234B may include one or more forwarding units that each includes, for example, one or more packet forwarding engines ("PFEs") each coupled to one or more interface cards. A forwarding unit may each represent, for example, a dense port concentrator (DPC), modular port concentrator (MPC), flexible physical interface card (PIC) concentrator (FPC), or another line card, for instance, that is insertable within a router 270 chassis or combination of chassis.

In accordance with techniques of this disclosure, the various routers 270 in the IP fabric 118 may execute the role determination process 280 at various times, such as during device startup, when joining fabric 118, during fabric reconfiguration, periodically, continuously, or otherwise. Router 270 maintains its own router settings 282, such as role settings (e.g., spine or leaf settings (e.g., self attribute.isSpine, self.attribute.Leaf2LeafProcedures, self.capabilities.leaf_to_leaf_procedures). During operation, router 270 may, in addition, receive various settings information from neighbor routers, such as level information (e.g., neighbor.level) or settings information (e.g., neighbor.capabilities.leaf_to_leaf_procedures). Router 270 may communicate with neighbors through, for example, IFCs 236 across links connected to any one of the IFCs 236. Once router 270 has a configured role, the router may then form adjacencies with its neighbor routers, thereby allowing router 270 to participate in various routing functionalities such as, for example, transmitting distance vectors for routes to lower neighbors or passing link state information to higher neighbors.

Distance vectors, or distance vector routing information, may include information about the routing table of router 270. Link state information may include connectivity-related information obtained by one or more link-state algorithms (e.g., a shortest path first algorithm), i.e., information about the neighbor routers of router 270. Routing protocol process 244 may operate according to properties of a modified link-state routing protocol (e.g., J. Moy, OSPF Version 2, RFC 2328, April 1998; and D. Oran, OSI IS-IS Intradomain Routing Protocol, RFC 1142, February 1990) when sending routing information to an ascending neighbor and may operate according to properties of a path-vector protocol (e.g., Y. Rekhter, A Border Gateway Protocol 4 (BGP-4), RFC 4271, January 2006) when sending routing information to a descending neighbor. The entire contents of RFC 2328, RFC 1142, and RFC 4271 are incorporated by reference herein.

Figure 3:
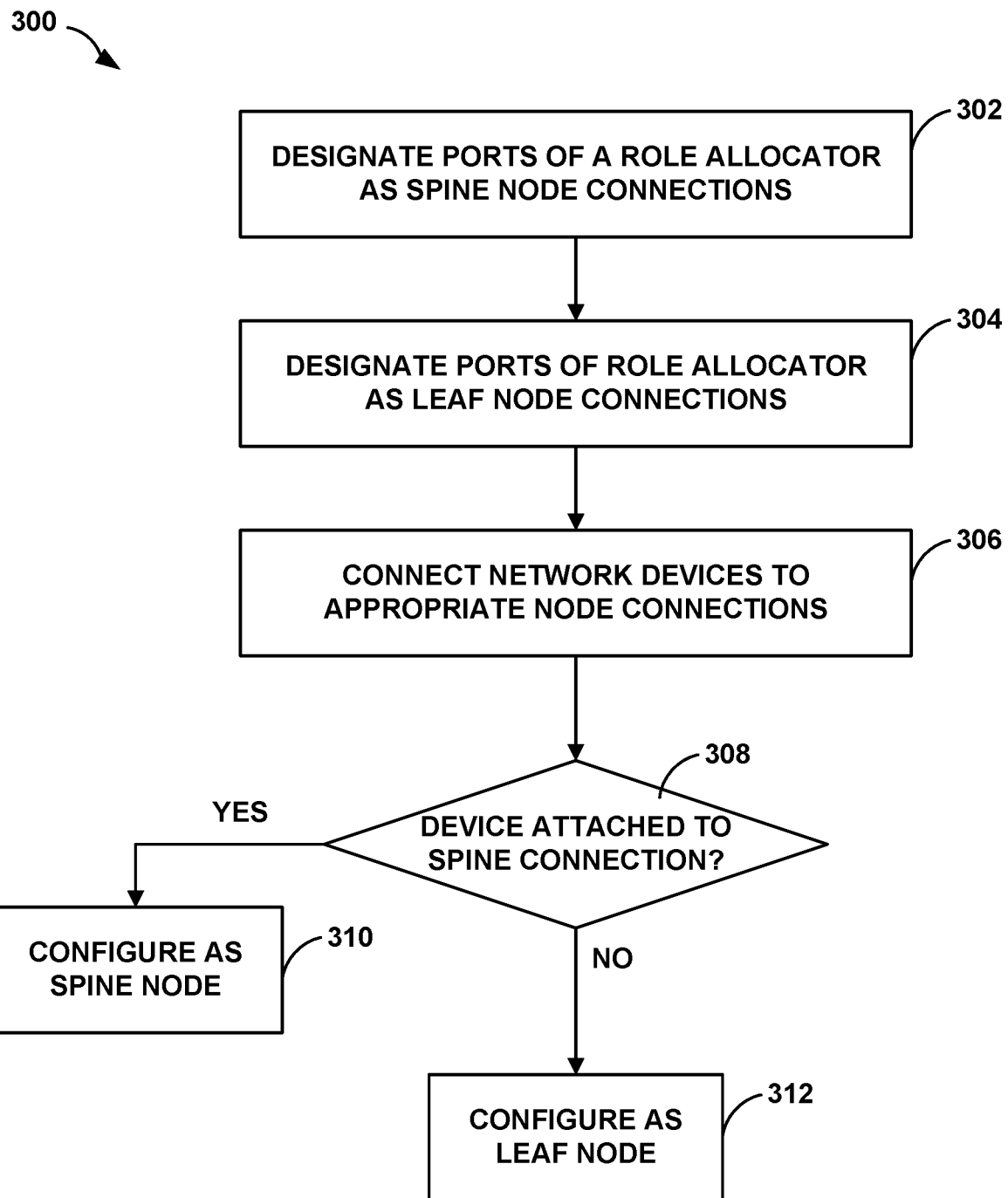
FIG. 3 is a flowchart illustrating an example method for deploying network devices in an IP fabric 118 according to the techniques of this disclosure.

FIG. 3 is a flowchart illustrating an example method 300 for deploying network devices in an IP fabric 118 according to the techniques of this disclosure. The method of FIG. 3 is explained with respect to router 270 of FIG. 2 and networks 100 of FIGS. 1A and 1B. However, other network devices (e.g., switches or other routers) may perform this or a substantially similar method. Moreover, the method of FIG. 3 need not necessarily be performed in the order shown.

As noted above, manual intervention to assign routers 270 to the role of spine or leaf can lead to misconfiguration. To counter this, as noted above, a role allocator 116 is deployed and connects to each of the network devices (nodes 104, 108) in IP fabric 118 via the management links 128 of a management network as shown in FIGS. 1A, 1B, and 2. Role allocator 116 may be a simple switch in which the lower (or upper) ports are designated as leaf ports and the upper (or lower) ports are designated as spine ports. In a larger deployment two switches may be deployed; one for spines and the other for leaves, such as shown in FIG. 1B. When network controller 114 discovers a new device, by virtue of its connectivity to the appropriate allocator, controller 114 automatically assigns the appropriate role and hence pushes the appropriate configuration to the device. In some examples, introducing such role allocator function into the management network may provide a powerful automation mechanism to reduce manual interventions and possible misconfiguration.

In one example approach, ports of allocator 116 are designated as spine node connections (302). Other ports of allocator 116 are designated as leaf node connections (304). Network devices being deployed into an IP fabric 118 are connected through management ports to ports of allocator 116 that match their roles (306). For instance, network devices that are being deployed as leaf nodes are connected to leaf node connection ports of allocator 116 while network devices that are being deployed as spine nodes are connected to spine node connection ports of allocator 116.

When a network device deployed to IP fabric 118 powers up, an attempt is made to discover if the device is connected to a spine node connection port of allocator 116 or a leaf node connection port of allocator 116 (308). If the device is connected to a spine node connection port of allocator 116 (YES at 308), the device is a spine node and it is configured accordingly (310). If the device is not connected to a spine node connection port of allocator 116 (NO at 308), the device is a leaf node and it is configured accordingly (312).

Figure 4:
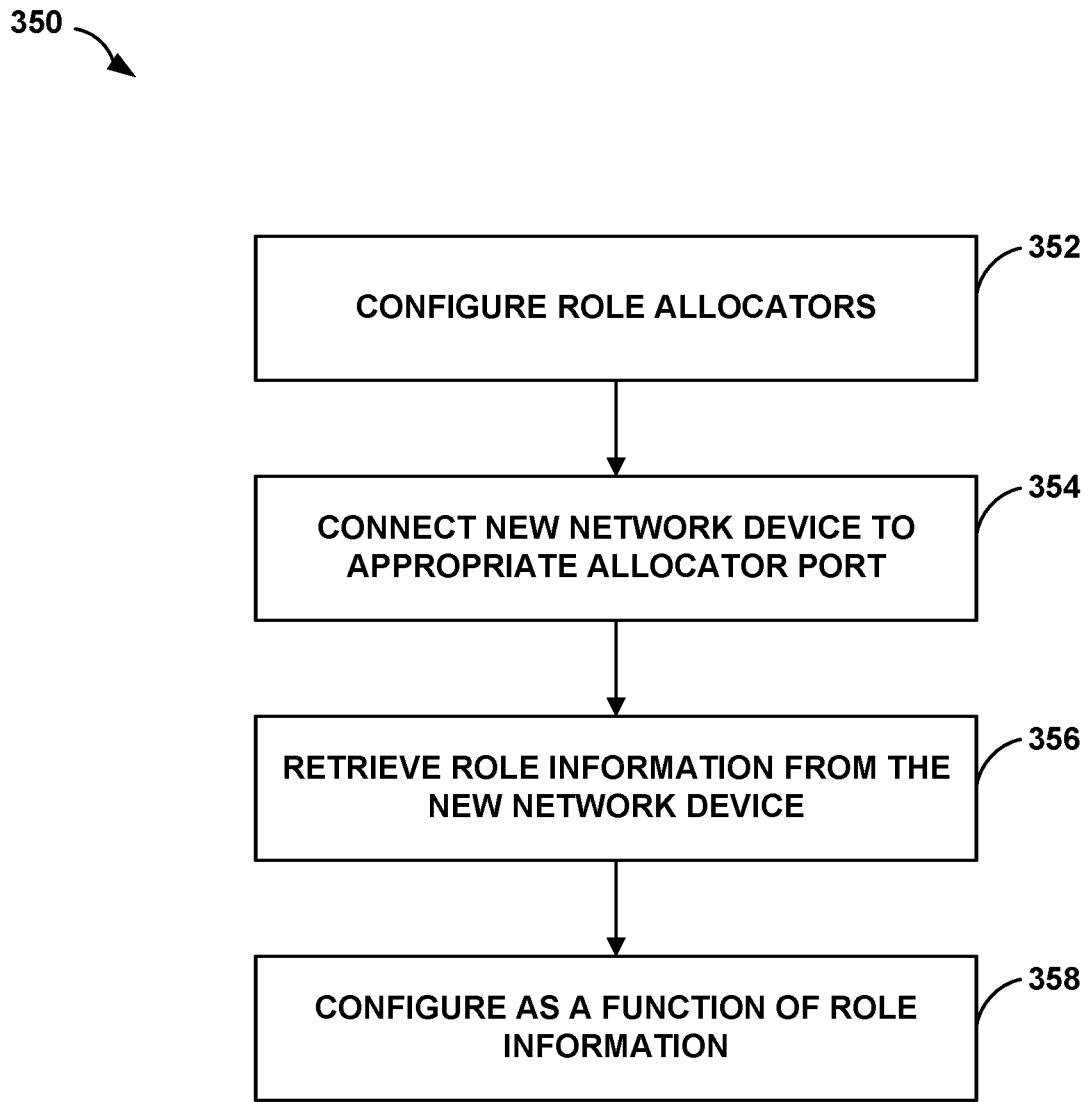
FIG. 4 is a flowchart illustrating an example method for automatically determining role information for network devices in an IP fabric according to the techniques of this disclosure.

FIG. 4 is a flowchart illustrating an example method 350 for automatically determining role information for network devices in an IP fabric 118 according to the techniques of this disclosure. The method of FIG. 4 is explained with respect to router 270 of FIG. 2 and networks 100 of FIGS. 1A and 1B. However, other network devices (e.g., switches or other routers) may perform this or a substantially similar method. Moreover, the method of FIG. 4 need not necessarily be performed in the order shown.

Initially, one or more role allocators 116 are configured for service (352). In one example approach, particular ports of a switch designated as role allocator 116 are designated as spine ports while others are designated as leaf ports. In some example approaches, as discussed in the description of FIGS. 1A, 1B and 2 above, nodes 104 and 108 are automatically assigned to their appropriate roles within the network topology based on their connection to allocator 116.

In one example approach, the ports of the switch designated as role allocator 116 are split in half, with the lowered number ports being designated as spine ports and the upper-number ports being designated as leaf ports. In another such approach, the ports are split in half, with the lowered number ports being designated as leaf ports and the upper-number ports being designated as spine ports. Ports may be designated as spine or leaf by other mechanism as well (e.g., even/odd ports). In addition, the management port connections on allocators 116 may be split in other ways (e.g., the lowest quarter or highest quarter ports could be designated as spine node port connections, with the remainder are designated as leaf node port connections).

In one such example approach, each router 270 is connected via its management port P to a port of an allocator 116 (354). As illustrated in FIG. 1A, devices 104, 108 within IP fabric 118 automatically are assigned to their network layer 120 level within the network topology (e.g., IP fabric 118) based on information received from role allocator 116. In one such example approach, a router 270 with an unknown role derives its own role by querying an attached role allocator 116, or by querying a dedicated allocator 124, 126 within role allocator 116 (356). In one such approach, each router 270 includes information detailing the ports on allocator 116 that are designated as spine node ports and the ports on allocator 116 that are designated as leaf node ports.

In addition, each router 270 includes program code allowing the router 270 to determine the port on the allocator 116, 124, 126 to which it is connected and to determine, based on the allocator port, whether it is a spine node or a leaf node. For instance, router 270 may use Link Layer Discovery Protocol (LLDP) to begin receiving packets at management port P from management link 128. If the packet is from a port on allocator 116 that is dedicated to spine nodes, the router 270 is a spine node. If the packet is, however, from a port on allocator 116 that is dedicated to leaf nodes, the router 270 is a leaf node. Router 270 is then configured based on its determined role (358). In one example approach, once router 270 has determined that it is a spine node or a leaf node, router 270 reaches out to a server on the management network to retrieve the appropriate configuration information. In other words, in one such example where router 270 "reaches out to a server," router 270 outputs a signal over a management network. The server, which is connected to the management network in this example, detects a signal over the management network and determines that the signal corresponds to a request for configuration information. The server outputs a responsive signal over the management network. Router 270 detects the responsive signal and determines that the responsive signal includes appropriate configuration information. The server may, in some examples, be or include allocator 116.

Figure 5:
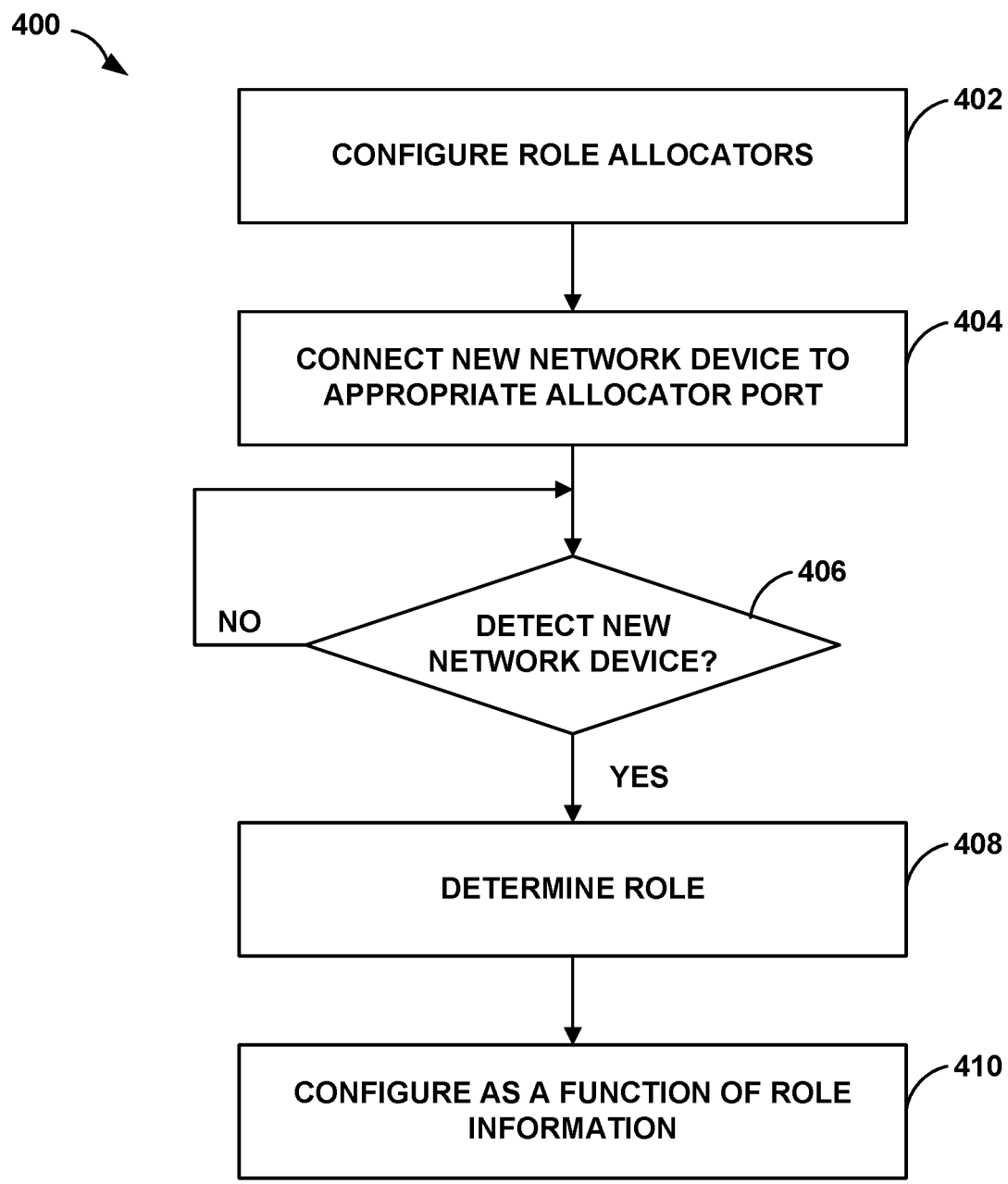
FIG. 5 is a flowchart illustrating another example method for automatically determining role information for network devices in an IP fabric according to the techniques of this disclosure.

FIG. 5 is a flowchart illustrating another example method 400 for automatically determining role information for network devices in an IP fabric 118 according to the techniques of this disclosure. In the example approach of FIG. 5, a network controller 114 connected through allocator 116 to a node 104, 108 determines the port on allocator 116 it is using to reach the node and configures the node as a spine or a node accordingly. That is, if the management port of router 270 is attached to a port of allocator 116 dedicated to spine nodes, the device is a spine node 104. If a management port is attached to a port of allocator 116 dedicated to leaf nodes, the device is a leaf node 108.

In one example approach, one or more role allocators 116 are configured for service (402). Each router 270 is connected via a management port (or a port dedicated as a management port) to a port of an allocator 116 (404). As illustrated in FIG. 1A, devices 104, 108 within IP fabric 118 automatically are assigned to their network layer 120 level within the network topology (e.g., IP fabric 118) based on information received from role allocator 116. As illustrated in FIG. 1B, devices 104, 108 within IP fabric 118 automatically are assigned to their network layer 120 level within the network topology (e.g., IP fabric 118) based on information received from spine allocator 124 or leaf allocator 126 of role allocator 116.

In one example approach, network controller 114 waits (NO at 406) to detect devices being added to IP fabric 118 (406). For instance, a device added to IP fabric 118 may, when initialized, begin transmitting on management port P and/or through link interfaces 236. In one example approach, a switch or router is mounted on a rack and powered up. The switch or router then reaches out through management link 128 to retrieve its IP address from the management network (e.g., via a Dynamic Host Configuration Protocol (DHCP) server).

When a new device is detected (YES at 406), network controller 114 determines its role (408). In one example approach, network controller 114 determines the new device's role by determining the port on allocator 116 to which the new device is attached. If the port on allocator 116 is designated as dedicated to spine nodes, the network controller 114 configures the new device as a spine node. If the port on allocator 116 is designated as dedicated to leaf nodes, the network controller 114 configures the new device as a leaf node. The new device is then configured based on its determined role (410).

In a like manner, if network controller 114 determines the new device is attached to a spine allocator 124, the network controller 114 configures the new device as a spine node. If network controller 114 determines the new device is attached to a leaf allocator 126, the network controller 114 configures the new device as a leaf node. Again, the new device is configured based on its determined role (410).

The techniques of this disclosure may provide one or more technical advantages over prior protocols. For example, the techniques of this disclosure may avoid the requirement for network administrators 112 to manually configure various parameters for each switch, such as defining each level 120 for each switch during configuration of the IP fabric 118 or the individual nodes 104, 108 that make up the IP fabric 118 (e.g., spine nodes 104, leaf nodes 108). This may avoid configuration errors and administrative burden on network administrators. Some example techniques allow administrators to network connect in-band to neighbor devices within the fabric prior to certain aspects of configuration of those devices, thereby avoiding the need to connect those devices to an out-of-band network.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. The term "computer-readable storage media" refers to physical storage media, and not signals, carrier waves, or other transient media.

What is claimed is:

1. A device comprising:
a plurality of network ports, each of the network ports capable of being coupled to a fabric; and
processing circuitry configured to:
establish a network connection through the fabric to a physical port of a plurality of ports of a system,
identify the physical port of the plurality of ports to which the device is connected over the network connection, wherein to identify the physical port, the processing circuitry is further configured to receive information from the system about the physical port, and
configure the device based on the identified physical port.

2. The device of claim 1, wherein to receive information about the port, the processing circuitry is further configured to:
determine, via a packet received from the system, a port number assigned to the physical port to which the device is connected.

3. The device of claim 1, wherein to receive information about the physical port, the processing circuitry is further configured to:
query the system.

4. The device of claim 1, wherein to establish the network connection through the fabric, the processing circuitry is further configured to:
establish the network connection through a management network configured within the fabric.

5. The device of claim 4, wherein to identify the physical port, the processing circuitry is further configured to:
determine, via a packet received over the management network, a port number assigned to the physical port of the system to which the device is connected.

6. The device of claim 5, wherein to identify the physical port, the processing circuitry is further configured to:
determine, based on the port number, whether the device is connected to a first level port or a second level port.

7. The device of claim 5, wherein to identify the physical port, the processing circuitry is further configured to:
determine, based on the port number, whether the device is connected to a port associated with a spine node or associated with a leaf node.

8. The device of claim 1, wherein to configure the device based on the identified physical port, the processing circuitry is further configured to:
retrieve configuration information for the device over the fabric.

9. The device of claim 1, wherein the plurality of ports of the system includes:
a first subset of ports designated as first level port connections and a second subset of ports designated as second level port connections.

10. The device of claim 9, wherein to configure the device based on the identified physical port, the processing circuitry is further configured to:
based on a determination that the identified physical port is one of the first subset of ports designated as first level port connections, configure the device as a first level device.

11. The device of claim 10, wherein to configure the device as a first level device, the processing circuitry is further configured to:
configure the device as a spine node.

12. The device of claim 9, wherein to configure the device based on the identified physical port, the processing circuitry is further configured to:
based on a determination that the identified port is one of the second subset of ports designated as second level port connections, configure the device as a second level device.

13. The device of claim 12, wherein to configure the device as a second level device, the processing circuitry is further configured to:
configuring the device as a leaf node.

14. A method comprising:
deploying a network device within a fabric by attaching a port of the network device to a physical port of a plurality of ports of a system;
establishing, by the network device, a network connection through the fabric to the physical port of the plurality of ports of the system;
identifying, by the network device, the physical port of the plurality of ports of the system to which the network device is connected over the network connection by receiving information from the system about the physical port; and
configuring the network device based on the identified physical port.

15. The method of claim 14, wherein receiving information about the physical port includes:
determining, via a packet received from the system, a port number assigned to the physical port of the system to which the network device is attached.

16. The method of claim 14, wherein receiving information about the physical port includes:
querying the system.

17. The method of claim 14,
wherein establishing the network connection through the fabric includes establishing the network connection through a management network included within the fabric; and
wherein identifying the physical port includes determining, via a packet received over the management network, a port number assigned to the physical port of the plurality of ports of the system to which the network device is attached.

18. Non-transitory computer-readable storage media having stored thereon instructions that, when executed, cause processing circuitry of a network device to:
establish a network connection through a fabric to a physical port of a plurality of ports of a system;
identify the physical port to which the network device is connected over the network connection, wherein identifying the physical port includes receiving information from the system about the physical port; and
configure the network device based on the identified physical port of the system.

* * * * *